United States Patent [19]

Mozeley, Jr.

[11] Patent Number: 5,099,894

[45] Date of Patent: Mar. 31, 1992

[54] SPILL CONTAINMENT AND FLEX HOSE PROTECTION DEVICE

[76] Inventor: David R. Mozeley, Jr., 6148A Bellhaven Blvd., Charlotte, N.C. 28209

[21] Appl. No.: 599,778

[22] Filed: Oct. 17, 1990

Related U.S. Application Data

[63] Continuation-in-part of Ser. No. 397,385, Aug. 23, 1989, abandoned.

[51] Int. Cl.$^5$ .............................................. B67D 5/04
[52] U.S. Cl. .......................................... 141/86; 141/98; 137/312; 137/234.6; 220/484
[58] Field of Search ................ 141/86, 88, 98, 311 A; 220/484, 85 F, 85 S; 137/234.6, 312, 314, 363-372; 222/108, 192

[56] References Cited

U.S. PATENT DOCUMENTS

| | | | |
|---|---|---|---|
| 1,188,446 | 6/1916 | Haines | 137/234.6 |
| 1,803,359 | 5/1931 | Shand | 222/108 |
| 2,131,270 | 9/1938 | Chittim | 222/108 |
| 2,225,622 | 12/1940 | Clapp | 222/192 |
| 2,434,824 | 1/1948 | Watts, Jr. et al. | 137/363 |
| 2,959,826 | 11/1960 | Larsen et al. | 137/234.6 |
| 3,263,853 | 8/1966 | Smith | 220/484 |
| 4,706,718 | 11/1987 | Milo | 141/86 |
| 4,842,163 | 6/1989 | Bravo | 137/312 X |
| 4,881,579 | 11/1989 | Sharp | 141/86 |
| 4,921,115 | 5/1990 | Fields, III | 220/85 F X |

FOREIGN PATENT DOCUMENTS 0252818  3/1967  Austria .................. 220/85 F

Primary Examiner—Henry J. Recla
Assistant Examiner—Casey Jacyna
Attorney, Agent, or Firm—Ralph H. Dougherty

[57] ABSTRACT

A gasoline dispenser is connected to a gasoline supply tank by a gasoline supply line. At the point where the supply line is to connect to the gasoline dispenser, a flex hose is used as the connecting mechanism. The flex hose connects to a shear valve capable of stopping the flow of gasoline from the gasoline supply tank to the gasoline dispenser. A container is installed under the dispenser and the flex hose is positioned within the container. Thus, the flex hose is protected from the environment and the soil is protected from gas spills associated with maintenance of the gas dispenser.

11 Claims, 2 Drawing Sheets

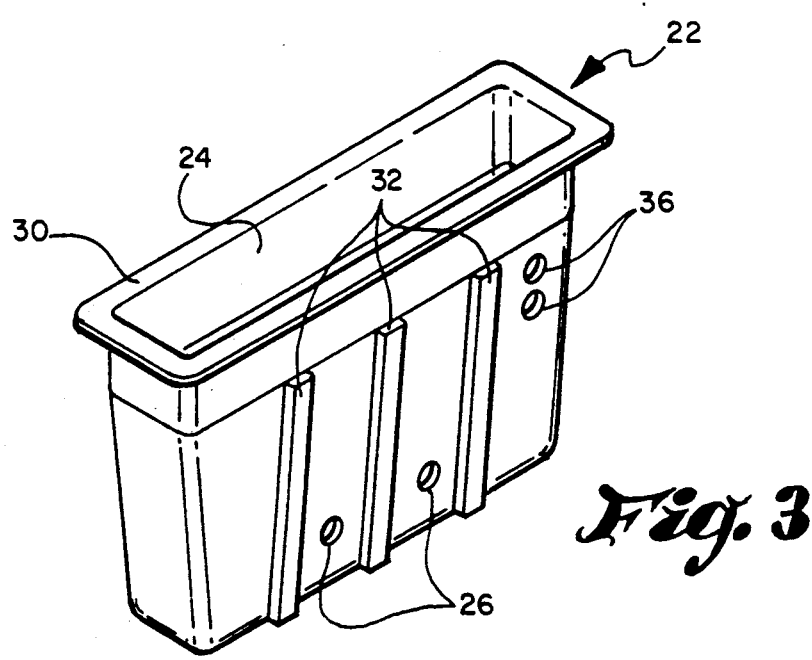
Fig. 3
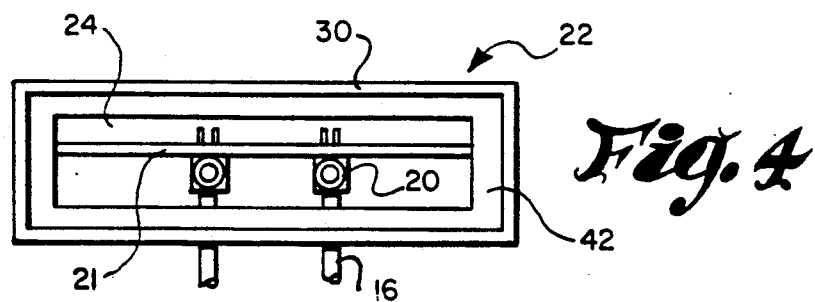
Fig. 4
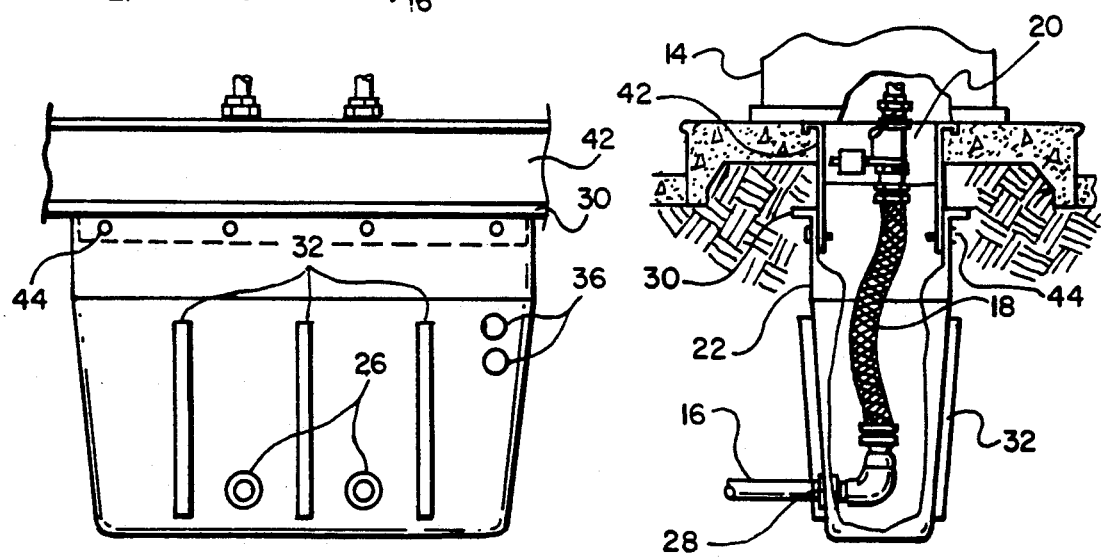
Fig. 5
Fig. 6

SPILL CONTAINMENT AND FLEX HOSE PROTECTION DEVICE

CROSS REFERENCE TO RELATED APPLICATION

This application is a continuation-in-part of co-pending application Ser. No. 07/397,385 filed Aug. 23, 1989 now abandoned.

BACKGROUND OF THE INVENTION

1. Field of the Invention

The present invention generally relates to liquid spill containment and, more particularly, is concerned with a spill containment and flex hose protection device for use in connection with gasoline dispensers.

2. Description of the Prior Art

Protection of the environment is certainly one of the most pressing issues facing society today. The occurrence of the Alaskan oil spill and the presence of acid rain highlight the importance of taking precautionary measures to protect the air, water, and soil. One environmental hazard that has received increased attention lately has been spills and leaks related to the dispensing of gasoline. The number of service stations in the United States has been estimated in excess of one hundred twenty thousand. Since a service station will typically have multiple dispensing units, and, therefore, multiple underground storage tanks ("USTs"), the potential for gasoline spills and/or leaks associated with gasoline dispensing is significant.

Consequently, gasoline dispensing is becoming more and more regulated both at the state and federal levels. For example, the Environmental Protection Agency ("EPA") regulations contain regulations for many of the nation's UST systems, including regulations concerning corrosion protection for associated piping. See 40 CFR 281. The EPA regulations also require each State to have a regulatory program for USTs that is as strict as or stricter than the Federal regulations.

In the dispensing of gasoline, a gasoline dispenser is typically connected to a gasoline supply tank by a gasoline supply line, most often made of fiberglass pipe. At the point where the supply line is to connect to the gasoline dispenser, a flex hose is used as the connecting mechanism. The flex hose is usually about 24" long and made of flexible stainless steel. The flex hose connects to a shear valve capable of stopping the flow of gasoline from the gasoline supply tank to the gasoline dispenser.

As used herein, the following terms have the associated meanings: "gasoline storage tank" means a UST for storing gasoline; "gasoline dispenser" means any mechanism for pumping and dispensing gasoline from a gasoline storage tank; "gasoline supply line" means any means for supplying gasoline from a gasoline storage tank to a gasoline dispenser; and "flex hose" means flexible connector piece connecting a gasoline dispenser with a gasoline supply line.

Unprotected steel USTs are frequently damaged by corrosion. When this happens, the metal UST system and its underground surroundings act like a battery. Part of the UST can become negatively charged and another part positively charged. Moisture in the soil provides the connecting link that finally turns these UST "batteries" on. Then, the negatively charged part of the UST system—where the current exits from the tank or its piping—begins to deteriorate. As electric current passes through this part, the hard metal begins to oxidize, forming loosely adherent rust, holes form, and leaks begin.

Steel tanks and piping can be protected by coating them with a corrosion-resistant coating and by using "cathodic" protection. Cathodic protection reverses the electric current that causes corrosion, and can be effected in two ways:

(a) "Sacrificial anodes" can be attached to the UST. Sacrificial anodes are pieces of metal more electrically active than the steel UST. Because these anodes are more active, the electric current will exit from them rather than the UST. Thus, the UST acts as the "cathode" and is protected from corrosion while the attached "anode" is sacrificed.

(b) An "impressed current" protection system introduces an electric current into the ground through a series of anodes that are not attached to the UST. Because the electric current flowing from these anodes to the tank system is greater than the corrosive current attempting to flow from it, the UST is protected from corrosion.

In addition, steel USTs can also be protected from corrosion if they are bonded to a thick layer of noncorrodible material, such as fiberglass-reinforced plastic. Cathodic protection is not needed with this "encapsulation" method of corrosion protection. Also, the corrosion problem can be totally avoided by using tanks and piping made completely of noncorrodible material, such as fiberglass.

EPA regulations (See 40 C.F.R. 280.31) require that all owners and operators of steel UST systems with corrosion protection must comply with the following requirements to ensure that releases due to corrosion are prevented for as long as the UST system is used to store regulated substances:

(a) All corrosion protection systems must be operated and maintained to continuously provide corrosion protection to the metal components of that portion of the tank and piping that routinely contain regulated substances and are in contact with the ground.

(b) All UST systems equipped with cathodic protection systems must be inspected for proper operation by a qualified cathodic protection tester in accordance with the following requirements:

(1) Frequency. All cathodic protection systems must be tested within six months of installation and at least every three years thereafter or according to another reasonable time frame established by the implementing agency; and (2) Inspection Criteria. The criteria that are used to determine that cathodic protection is adequate as required by this section must be in accordance with a code of practice developed by a nationally recognized association.

(c) UST systems with impressed current cathodic protection systems must also be inspected every 60 days to ensure the equipment is running properly.

(d) For UST systems using cathodic protection, records of the operation of the cathodic protection must be maintained to demonstrate compliance with the performance standards.

The present invention is installed under the liquid fuel dispenser and the flex hose is positioned within the container. Thus, the flex hose is protected from the environment. Anode bags, heretofore used to detect deterioration of the flex hose, become unnecessary. Anode bags are expensive and cumbersome to check. In addition, the device will protect the soil from gasoline spills occurring while working on the dispenser. The device is light and easy to install, weighing only 30 lbs. or less. It is made of 3/16" fiberglass, has a 1" lip around the top, and is reinforced to enable backfilling.

The applicant is aware of the following U.S. Patents concerning spill containment devices in general.

| U.S. Pat. No. | Inventor | Issue Date | Title |
| --- | --- | --- | --- |
| 1,188,446 | Haines | 6/27/1916 | GASOLINE-SUPPLY APPARATUS |
| 4,098,438 | Taylor | 7/4/1978 | GASOLINE SPILL PREVENTION SYSTEM AND APPARATUSES |
| 4,204,564 | Balfour | 5/27/1980 | GASOLINE SPILL PREVENTING APPARATUS |
| 4,603,432 | Marino | 7/29/1986 | SPILL CONTAINMENT BAG AND METHOD OF USING THE SAME |
| 4,644,983 | Bishop | 2/24/1987 | SPILL REDUCING SYSTEM |
| 4,659,251 | Petter et al. | 4/21/1987 | LIQUID SPILL CONTAINER AND METHOD OF MAKING AND INSTALLING SAME |
| 4,696,330 | Raudman et al. | 9/29/1987 | SPILL COLLECTOR ASSEMBLY FOR LIQUID STORAGE VESSELS |
| 4,706,718 | Milo | 11/17/1987 | CONTAINMENT MANHOLE HAVING SPILLAGE SEALING MEANS |
| 4,762,440 | Argandona | 8/9/1988 | SPILL CONTAINMENT DEVICE |

Haines relates to appartus for supplying liquids of any kind or class for various purposes from a stationary or fixed reservoir or container and particularly to apparatus for supplying gasolene for use by motors. Haines discloses a pit b3 composed of concrete or other suitable material adapted to receive a supplemental tank or receiver c which may be lowered into the pit b3, or raised as shown in FIGS. 1, 2 and 3. Webster's Third New International Dictionary defines "pit" as "a hole, shaft, or cavity in the ground formed naturally (as by erosion) or artificially (as by digging)." "Cavity," "crater," "furrow," "hole," and "hollow" are all synonyms for the word "pit." The Haines' pit b3 is not equivalent to applicant's container 22. Applicant's container 22 is a light, easy to install, gasoline-impermeable device specifically used for shielding flex hoses against the environment and for containing gasoline spills, whereas Haines' pit b3 is used for receiving a supplemental tank or receiver c which may be lowered into the pit b3. Haines suggests a pit composition of concrete or "other suitable material." In general, concrete is porous and incapable of adequately containing gasoline spills. Additionally, concrete is susceptible to cracking and breakage, rendering it unsuitable for the purposes of the present invention. It is clear that the phrase "other suitable material" refers to material suitable for receiving a supplemental tank or receiver c which may be lowered in the pit b3. Although a variety of materials may be suitable for that purpose, applicant's container must be made of a gasoline-impermeable material in order to fulfill the objects of the invention. The Haines patent is inapplicable in that the present invention differs structurally from Haines, is not fully met by the teachings of Haines, and is therefore not anticipated by Haines. In addition, neither would Haines render the present invention obvious since it neither discloses nor suggests the use of a container for shielding flex hoses against the environment and for containing gasoline spills.

The Taylor, Marino, and Bishop patents relate generally to spill containment devices, but are not directly relevant to the invention. The remaining patents each disclose a spill containment device for use in connection with filling underground liquid storage containers.

Petter et al. teaches a liquid spill container and method of making and installing the container wherein the container has a side wall comprised of at least two separate portions which are detachably fastened together.

Balfour provides a means for retaining the gasoline filling the delivery hose by directing it to a dump tank which is automatically drained into the storage tank as gasoline is pumped therefrom in normal service station operation.

Raudman et al. discloses a receptacle for accumulating spilled liquids about the inlet pipe of a storage tank. The receptacle is slidably fitted within a stationary housing.

Milo teaches a containment manhole which includes a hollow body having a closed bottom and an open top. An opening is provided for the fill pipe, with an associated seal.

Finally, Argandona teaches a spill container having a bottom opening for receiving a storage tank fill tube, a top access opening through with the fill tube is accessible for filling the tank, and means for sealing the tube to the spill container wall, whereby the container contains any liquid spill during filling of the tank.

Each of the patents discussed above relates to spillage problems associated with filling a liquid storage tank, as opposed to problems associated with dispensing liquid from a storage tank. In addition, the cited references relate to complicated, multi-part devices requiring sophisticated manufacturing techniques. The present invention is uncomplicated and easy to manufacture.

Applicant is unaware of any prior art that accomplishes the objects of the present invention. Consequently, a need exists for a device which will result in containing spills, and protecting flex hoses, associated with service station gasoline dispensers.

SUMMARY OF THE INVENTION

The present invention is an innovative liquid spill containment and flex hose protection device, which overcomes the problems and satisfies the needs previously considered.

A gasoline dispenser is connected to a gasoline supply tank by a gasoline supply line. At the point where the supply line is to connect to the gasoline dispenser, a flex hose is used as the connecting mechanism. The flex hose connects to a shear valve capable of stopping the flow of gasoline from the gasoline supply tank to the gasoline dispenser. A container is installed under the dispenser and the flex hose is positioned within the container. Thus, the flex hose is protected from the environment and the soil is protected from gas spills associated with maintenance of the gas dispenser.

In summary, the invention encompasses a spill containment and flex hose protection device for deployment beneath and in connection with gasoline dispensers.

OBJECTS OF THE INVENTION

The principal object of the present invention is to provide means for protecting a gasoline supply line flex hose against contact with the environment.

Another object of the invention is to provide means for protecting the soil from gasoline spills occasioned by maintenance of a gasoline dispenser.

It is another object of the invention is to provide low cost mechanism for spill containment and flex hose protection.

Another object of the invention is to provide a liquid spill containment device that is simple to construct and easy to install.

Another object of the invention is to provide a durable device that can withstand changes to subsurface conditions, such as rain drenched soil and increased pressure on the exterior of the device, as well as temperature extremes.

Another object of the invention is to provide a device which meets or exceeds governmental requirements for flex hose protection and spill containment.

BRIEF DESCRIPTION OF THE DRAWINGS

The foregoing and other objects will become more readily apparent by referring to the following detailed description and the appended drawings in which:

FIG. 3 is an isometric view of the invented liquid spill container shown in FIG. 2.

FIG. 4 is a plan view of the top of the spill container of FIG. 3 showing flex-hose connectors.

FIG. 5 is a side elevation of the installed container.

FIG. 6 is a partially cut away end elevation view of the installed container and contents thereof.

DESCRIPTION OF THE PREFERRED EMBODIMENTS

Figure 1:
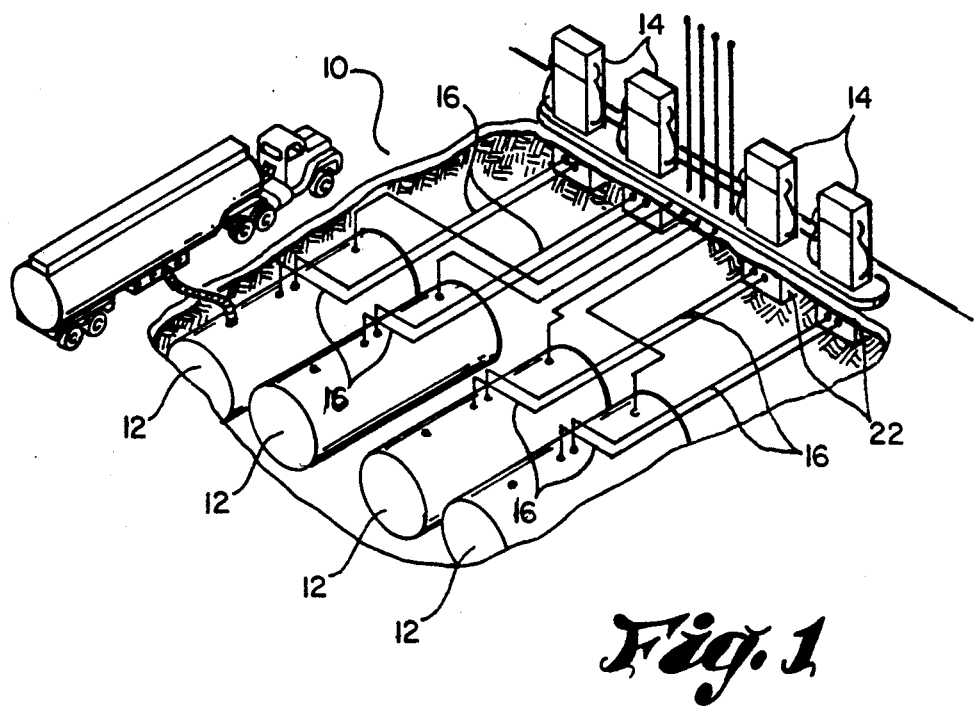
FIG. 1 is an isometric view of invented spill containment and flex protection devices in operation with a gasoline dispensing system from underground storage tanks.
Figure 2:
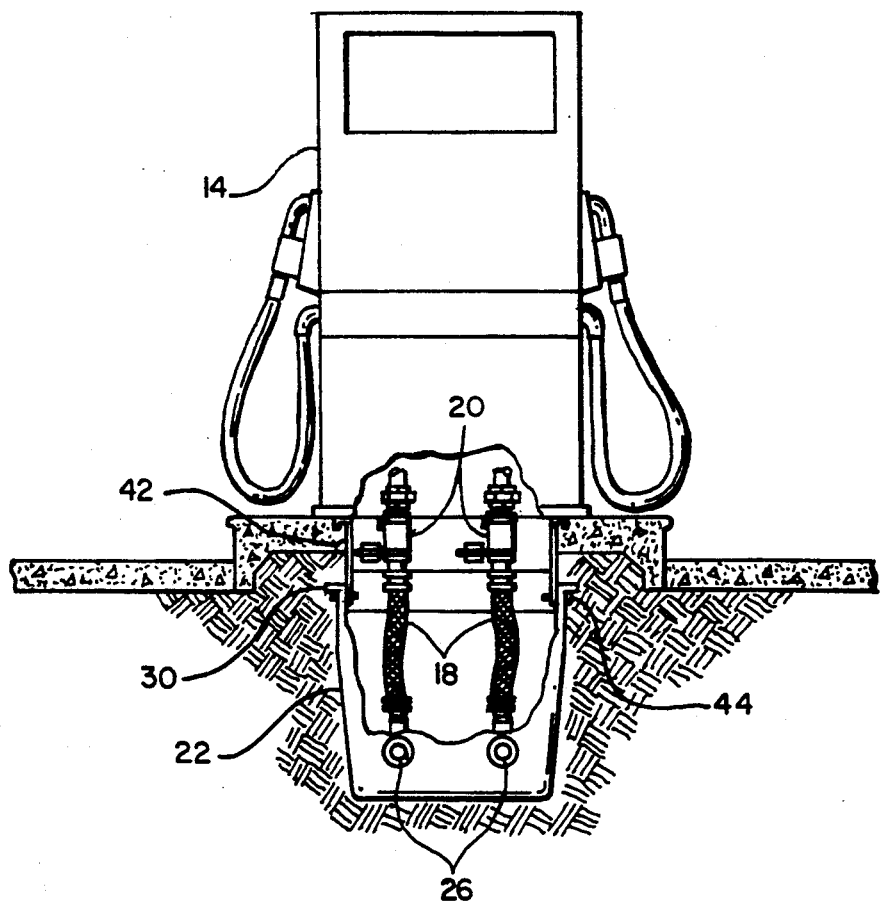
FIG. 2 is a front elevation of a gasoline dispenser with the inverted spill containment system, with the container shown partially cutaway.

Referring now to the drawings, and more particularly, to FIG. 1, apparatus for protecting against gasoline spillage and flex hose corrosion in connection with dispensing gasoline, generally designated 10, comprises the preferred embodiment of the present invention.

The apparatus 10 for protecting against gasoline spillage and flex hose corrosion in connection with dispensing gasoline includes a gasoline supply tank 12, a gasoline dispenser 14, a gasoline supply line 16, a flex hose 18, a shear valve 20, and a container 22. Additional supply tanks and associated equipment may also be used. The container 22 shields flex hoses 18 from the soil, protects flex hoses against environmental corrosive forces, such as water, from entering into the container, and protects against gasoline spillage. Means for detecting the presence of liquid or other material within the container 22 may also be provided.

The gasoline supply line 16 communicates with the gasoline supply tank 12 and the gasoline dispenser 14 and supplies gasoline from the gasoline supply tank 12 to the gasoline dispenser 14. A flex hose 18 communicates with the end of the gasoline supply line 16 closest to the gasoline dispenser 14, and connects the gasoline supply line 16 to the gasoline dispenser 14. The shear valve 20 is positioned at the base of the gasoline dispenser 14 and communicates with the flex hose 18 for stopping the flow of gasoline from the gasoline supply tank 12 to the gasoline dispenser 14. A means 21 for securing the shear valve 20 in an upright position is also provided.

The container 22 shields the flex hose 18 against the environment and contains gasoline spills. The container 22 has a mating opening 24 for receiving and mating with the base portion of the gasoline dispenser 14 and is positioned underneath the gasoline dispenser 14. Preferably, the container opening 24 mates with a standard shear box 42 and is attached to the shear box with screws 44. Thus, the container 22 is detachable from the shear box 42. The container 22 also has one or more supply line openings 26 for receiving supply lines 16, positioned in such a way that the supply line openings 26 are at a higher level than a desired level of gasoline the container 22 is capable of containing. The container 22 wholly contains the flex hose 18.

In the preferred embodiment, the container 22 is made of fiberglass and is positioned below ground in relation to the gas dispenser 14. Alternatively, the container 22 can be positioned above ground in relation to the gas dispenser 14. A lip 30 protrudes outwardly from the container 22 and extends around the periphery of the opening 24, for receiving and mating with the shear box 42 of the gasoline dispenser 14. Preferably, the container 22 includes a reinforcement mechanism 32 on the exterior of the container 22 for providing increased strength against exterior pressure. Special purpose openings 36 in the container 22 for the introduction of electrical conduits, vapor return lines, and miscellaneous additional lines can also be provided. Further, a sealing mechanism 28 is positioned between and communicates with each supply line opening 26 and each gasoline supply line 16 for preventing the escape of gasoline through the supply line opening 26. The sealing mechanism 28 can be a grommet, a gasket, or packing such as neoprene.

In operation, a gasoline supply truck fills the gasoline supply tanks 12 with an appropriate amount and type of gasoline product. A gasoline dispenser 14 pumps and draws the gasoline product from the gasoline supply tank 12 through a gasoline supply line 16. A flex hose 18 communicates with the end of the gasoline supply line 16 closest to the gasoline dispenser 14, and connects the gasoline supply line 16 to the gasoline dispenser 14. The container 22 shields the flex hose 18 against the environment and contains gasoline spills which may occur during maintenance of the dispenser 14.

SUMMARY OF THE ACHIEVEMENTS OF THE OBJECTS OF THE INVENTION

From the foregoing, it is readily apparent that I have invented a device for protecting a flex hose against contact with the environment, protecting the soil from gas spills occasioned by maintenance of the gas dispenser, that is durable, low in cost, simple to construct, and easy to install.

It is to be understood that the foregoing description and specific embodiments are merely illustrative of the best mode of the invention and the principles thereof, and that various modifications and additions may be made to the device by those skilled in the art, without departing from the spirit and scope of this invention, which is therefore understood to be limited only by the scope of the appended claims.

I claim:

1. An apparatus for protecting soil against gasoline spillage, in connection with dispensing gasoline, comprising:
   (a) at least one gasoline supply tank;
   (b) a gasoline dispenser, having a base portion, said dispenser adapted to be mounted to a foundation slab, wherein said base portion of said gasoline dispenser includes a standard shear box positioned underneath said gasoline dispenser, said shear box sized to extend below said foundation slab;
   (c) at least one gasoline supply line, corresponding to each gasoline supply tank, each gasoline supply line in communication with each gasoline supply tank and said gasoline dispenser, for supplying gasoline from each gasoline supply tank to said gasoline dispenser;
   (d) at least one flex hose, corresponding to each gasoline supply line, each flex hose in communication with the end of each gasoline supply line closest to said gasoline dispenser, for connecting each gasoline supply line to said gasoline dispenser; and
   (e) a non-concrete, gasoline-impermeable container for shielding each flex hose against the environment and for containing gasoline spills, having a mating opening for receiving and mating with said shear box of said base portion of said gasoline dispenser wherein said mating opening is detachably affixed to said shear box beneath said foundation slab with screw fastening means, said container positioned underneath said mating opening, and having at least one supply line opening for each gasoline supply line for receiving each supply line, each supply line opening positioned in said container at an advantageously selected location, said container shielding each flex hose from contact with said soil, and said container having a vertically oriented reinforcement mechanism on the exterior of said container for providing increased strength against exterior pressure.

2. The apparatus as set forth in claim 1, wherein said container made of fiberglass.

3. The apparatus as set forth in claim 1, wherein said container is adapted to provide a durable device that can withstand changes to subsurface conditions, including rain drenched soil and increased pressure on the exterior of said container, as well as temperature extremes.

4. The apparatus as set forth in claim 1, wherein said container is positioned below ground in relation to said gas dispenser.

5. The apparatus as set forth in claim 1, further comprising a lip protruding outwardly from said mating opening of said container, said lip encompassing the periphery of said opening, for receiving and mating with said base portion of said gasoline dispenser.

6. The apparatus as set forth in claim 5, wherein said base portion of said gasoline dispenser is a standard shear box underneath said gasoline dispenser and said container communicates with and is affixed to said shear box.

7. The apparatus as set forth in claim 1, further comprising said container having at least one opening for the introduction of electrical conduits.

8. The apparatus as set forth in claim 1, further comprising said container having at least one opening for the introduction of vapor return lines.

9. The apparatus as set forth in claim 1, further comprising a sealing mechanism positioned between each supply line opening and each gasoline supply line for preventing the escape of spilled gasoline through said supply line opening.

10. The apparatus as set forth in claim 9, wherein said sealing mechanism is selected from the group comprising a grommet, a gasket, and a neoprene packing mechanism.

11. The apparatus as set forth in claim 1, wherein said container weighs no more than 30 pounds.

* * * * *